United States Patent [19]
Best

[11] Patent Number: 5,909,784
[45] Date of Patent: Jun. 8, 1999

[54] SPRING MOTOR

[76] Inventor: Theodore O. Best, 1596 Union Port Rd., Apt. 5-H, Bronx, N.Y. 10462

[21] Appl. No.: 08/966,795

[22] Filed: Nov. 10, 1997

[51] Int. Cl.$^6$ ........................................................ F03G 1/00
[52] U.S. Cl. ............................................... 185/10; 185/39
[58] Field of Search .................................. 185/10, 11, 39, 185/40 R, 40 H, 41 R

[56] References Cited

U.S. PATENT DOCUMENTS

| 469,049 | 10/1892 | McDonald | 185/11 |
| 473,029 | 4/1892 | Strasser | 185/40 H |
| 1,033,418 | 7/1912 | Kime | 185/10 |

FOREIGN PATENT DOCUMENTS

| 203905 | 10/1923 | United Kingdom | 185/41 R |

*Primary Examiner*—John A. Jeffery
*Assistant Examiner*—Marcus Charles
*Attorney, Agent, or Firm*—Darby & Darby

[57] ABSTRACT

The present invention is a spring motor providing an efficient storage of mechanical energy, translating the potential energy of wound springs to mechanical rotation. The invention includes a frame supporting two gears having peripheral teeth. A first coil spring is positioned about a first shaft and is attached to the first gear and the frame. Similarly, a second coil spring is positioned about a second shaft and is attached to the second gear and the frame. The peripheral teeth of the two gears engage with each other so that rotation of the first gear causes rotation of the second gear. The first and second coil springs are opposingly wound so that potential energy stored in the first coil spring is mechanically transferred, in an oscillating manner, to the second coil spring through rotation of the gears. A chain is attached to the peripheral teeth of the gears so that the chain is linearly displaced as the gears oscillate. Means is provided for transforming the linear displacement of the chain to rotational displacement of the first or second gear.

1 Claim, 2 Drawing Sheets

SPRING MOTOR

BACKGROUND OF THE INVENTION

1. Field of the Invention

This invention is generally related to motors for providing rotational mechanical power, and more particularly, to motors that utilize the potential energy of springs to provide such rotational mechanical power.

2. Description of the Prior Art

Various spring driven motors have heretofore been developed. See, for example, Holley, U.S. Pat. No. 4,371,058, and Smith, U.S. Pat. No. 4,287,428.

It is an object of the invention to provide a spring motor that translates potential energy of a coil spring into mechanical rotational displacement.

SUMMARY OF THE INVENTION

The present invention is a spring motor providing an efficient storage of mechanical energy, translating the potential energy of wound springs to mechanical rotation. The invention includes a frame supporting two gears having peripheral teeth. A first coil spring is positioned about a first shaft and is attached to the first gear and the frame. Similarly, a second coil spring is positioned about a second shaft and is attached to the second gear and the frame. The peripheral teeth of the two gears engage with each other so that rotation of the first gear causes rotation of the second gear. The first and second coil springs are opposingly wound so that potential energy stored in the first coil spring is mechanically transferred, in an oscillating manner, to the second coil spring through rotation of the gears. A chain is attached to the peripheral teeth of the gears so that the chain is linearly displaced as the gears oscillate. Means is provided for transforming the linear displacement of the chain to rotational displacement of the first or second gear.

DETAILED DESCRIPTION OF THE PREFERRED EMBODIMENT

Figure 1:
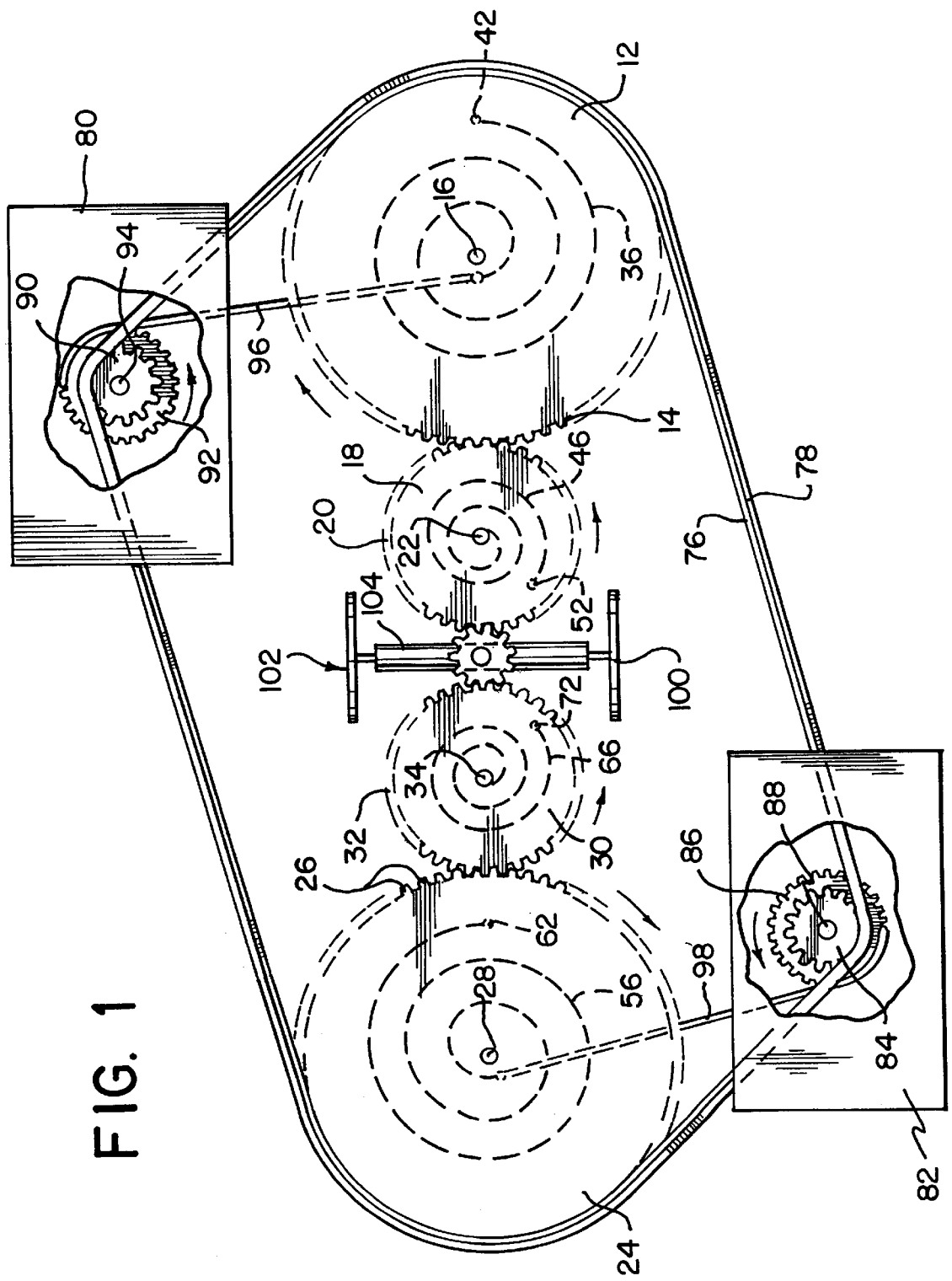
FIG. 1 is a plan view of a spring motor, according to the invention.
Figure 2:
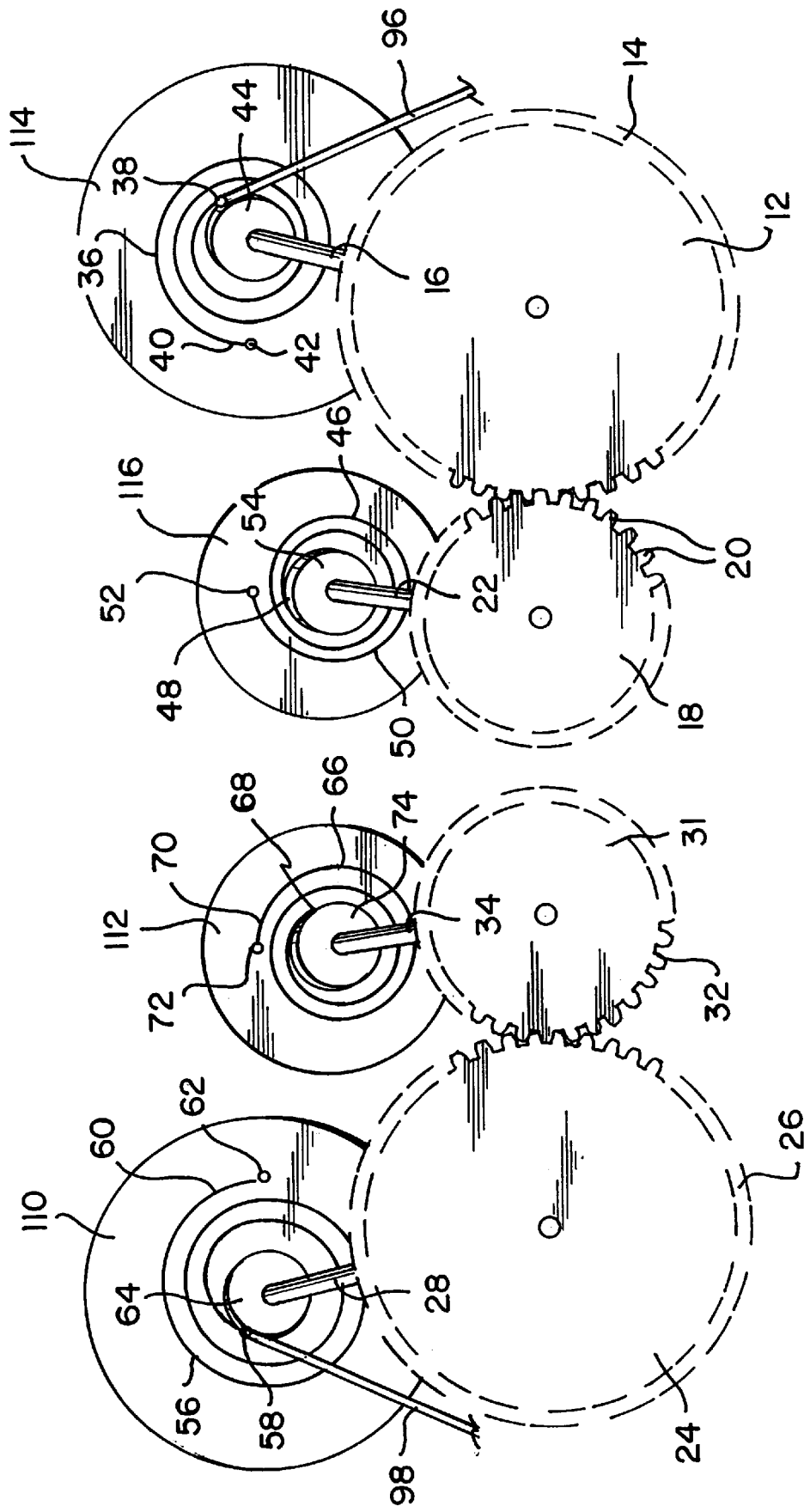
FIG. 2 is a perspective view of a portion of the spring motor, according to the invention, showing details of the interconnection of a loading gear and a storage gear and the interconnection of a coil spring and a gear.

Referring to FIG. 1, a spring motor 10 is shown according to the invention including a frame, (schematically shown as reference 1 in FIG. 1) a first storage gear 12 having peripheral teeth 14 is rotatably mounted to the frame, supported by and fixed to a shaft 16. A first loading gear 18 has peripheral teeth 20 and is also rotatably mounted to the frame through a shaft 22 so that first loading gear 18 and first storage gear 12 are generally parallel to each other and coplanar, and so that peripheral teeth 20 of first loading gear 18 engage peripheral teeth 14 of first storage gear 12.

Similarly, a second storage gear 24 having peripheral teeth 26 is rotatably mounted to the frame, supported by and fixed to a shaft 28. A second loading gear 30 has peripheral teeth 32 and is also rotatably mounted to the frame through a shaft 34 so that second loading gear 30 and second storage gear 24 are generally parallel to each other and coplanar, with respect to the frame, and so that peripheral teeth 32 of second loading gear 30 engage peripheral teeth 26 of second storage gear 24.

A third wheel 110 is connected to shaft 28. Third wheel 110 includes a coil spring 56 spirally wound about shaft 28 and defining an inner end 58 and an outer end 60. Coil spring 56 is preferably positioned immediately adjacent to and parallel with second wheel 110. Outer end 60 of coil spring 56 is fixedly attached to third wheel 110 at a point 62. Inner end 58 of coil spring 56 is fixedly attached to a first end of a second linking chain 98.

A fourth wheel 112 is connected to shaft 34 through a one-way clutch mechanism 74. Fourth wheel 112 includes a coil spring 66 spirally wound about shaft 34 and defining an inner end 68 and an outer end 70. Coil spring 66 is preferably positioned immediately adjacent to and parallel with fourth wheel 112. Outer end 70 of coil spring 66 is fixedly attached to fourth wheel 112 at a point 72. Inner end 68 of coil spring 46 is attached to a one-way clutch mechanism 74. Coil spring 66 is wound about shaft 22 in an opposite direction to coil spring 56 of third wheel 110.

First storage gear 12 also includes a coil spring 36 spirally wound about shaft 16 and defining an inner end 38 and an outer end 40 in a manner similar to how spring 56 is disposed about shaft 28. Thus, coil spring 36 is preferably positioned immediately adjacent to and parallel with first wheel 114. Outer end 40 of coil spring 36 is fixedly attached to first wheel 114 at a point 62. Inner end 38 of coil spring 36 is attached to a first end of first linking chain 96.

First loading gear 18 includes a coil spring 46 spirally wound about shaft 22 and defining an inner end 48 and an outer end 50. Coil spring 46 is preferably positioned immediately adjacent to and parallel with second wheel 116. Outer end 50 of coil spring 46 is fixedly attached to second wheel 116 at a point 52. Inner end 48 of coil spring 46 is attached to a one-way clutch mechanism 54. Coil spring 46 is wound in an opposite direction to coil spring 36 of first storage gear 12.

Coil spring 66 of second loading gear 30 is wound opposite to coil spring 46 of first loading gear 18. Similarly, coil spring 56 of second storage gear 24 is wound opposite to coil spring 36 of first storage gear 12.

Peripheral teeth 14 of first storage gear 12 and peripheral teeth 26 of second storage gear 24 are mechanically interconnected, preferably by a chain 76, as shown in FIG. 1, so that rotation of either first or second storage gear causes similar rotation of the other. Depending on the particular arrangement of parts, chain 76 may be slidably mounted in an appropriate guide rail 78, as shown in FIG. 1. (although not shown in FIG. 1, chain 76 engages the peripheral teeth of both first and second storage gears 12, 24).

Connected to chain 76 are two identical winder assemblies; a first winder 80, and a second winder 82. The winder assemblies 80, 82 are also known in the art as pulley hoists. Winder 80 includes a first sprocket 84 which is engaged with chain 76. First sprocket 84 is mechanically connected to a second sprocket 86 through a shaft 88. Similarly, winder 82 includes a first sprocket 90 which is also engaged with chain 76. First sprocket 90 is mechanically connected to a second sprocket 92 through a shaft 94.

First linking chain 96 is connected to inner end 38 of coil spring 36. A second linking chain 98 is connected to inner end 58 of coin spring 56.

Each first sprocket 84, 90. is preferably smaller in diameter than each respective second sprocket 86, 92 so that as chain 76 moves along chain guide 78 a first distance, first and second linking chains 96, 98 are displaced a greater second distance.

A generator (not shown) includes a drive assembly 100 is mechanically engaged with first and second loading gears 18, 30, through a differential gearing assembly 102. Differential gearing assembly 102, as is well understood by those skilled in the art, is adapted to translate clockwise or counter clockwise rotational displacement of either first and/or second loading gears 18, 30 into rotational displacement of an output shaft 104 (which is connected to drive assembly 100) of a uniform direction (e.g., only clockwise).

Differential gearing assembly 102 is preferably engaged with peripheral teeth 20 of first loading gear 18 and peripheral teeth 32 of second loading gear 30 so that as first and second loading gears 18, 30 rotate during the operation of the invention, as described below, differential gearing assembly 102 causes generator 100 to generate electricity.

In operation of the present invention, first storage gear 12 is initially rotated clockwise so that coil spring 36 and coil spring 46 of first loading gear 18 are wound, storing potential energy. Once released, first storage gear 12 will rotate counter clockwise, forced in that direction by the now unwinding coil spring 36. As first storage gear 12 rotates, chain 76, which is displaced about chain guide 78, rotates second storage gear 24 in a counter clockwise direction and displaces second linking chain 98, as first and second sprockets 84, 86 are rotated by chain 76. As second linking chain 98 is displaced it winds up coil spring 56 by pulling on inner end 58, thereby tightening spring 56 counter clockwise. Coil spring 56 is also wound by rotating outer end 60 clockwise, as second storage gear 24 rotates clockwise.

The result is that coil spring 56 becomes wound just as the stored potential energy of coil spring 36 is depleted. Simultaneously, second loading gear 30 is rotated clockwise due to the intermeshing of gears with second storage gear 24. Thus, wheel 112 is caused to rotate clockwise, thereby tightening spring 66 (i.e., storing potential energy).

To complete the cycle, second storage gear 24 (now loaded) rotates in a clockwise direction and moves chain 76 clockwise which forces first storage gear 12 to rotate clockwise. Simultaneously, second loading gear 30 (now loaded) rotates counter clockwise. As before, first linking chain 96 now winds up coil spring 36 by rotating inner end 38 about shaft 16, just as coil spring 56 depletes its stored potential energy.

The cycle continues, with first and second storage gears 12, 24 oscillating back and forth, with each unwinding spring winding the opposing spring so that the cycle may continue until all potential energy is gone from both springs. As the storage gears 12, 24 oscillate, they rotate loading gears 18, 30 which, in turn, drives differential gearing assembly 102 and generator (not shown).

What is claimed is:

1. A spring motor, comprising:

a frame;

a first gear having peripheral teeth, said first gear rotatably supported by a first shaft;

a second gear having peripheral teeth, said second gear rotatably supported by a second shaft, said first and second shafts being mounted to said frame;

a first coil spring positioned about said first shaft and attached to said first gear and said frame;

a second coil spring positioned about said second shaft and attached to said second gear and said frame;

said peripheral teeth of said first gear are connected to said peripheral teeth of said second gear so that rotation of said first gear causes rotation of said second gear;

said first and second coil springs being opposingly wound so that potential energy stored in said first coil spring is mechanically transferred to said second coil spring through rotation of said first and second gears, said transfer occurring in an oscillatory manner;

a chain attached to said peripheral teeth of said gears so that said chain is linearly displaced as said gears oscillate; and means for transforming said linear displacement of said chain to rotational displacement of said first gear.

* * * * *